US008997184B2

(12) United States Patent
Vellozo Luz et al.

(10) Patent No.: US 8,997,184 B2
(45) Date of Patent: *Mar. 31, 2015

(54) SYSTEMS AND METHODS FOR PROVIDING A ONE-TIME AUTHORIZATION

(75) Inventors: Andre Gustavo Vellozo Luz, Sao Paulo (BR); Mauricio Ghetler, São Paulo (BR)

(73) Assignee: Paychief LLC, New York, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/531,174

(22) Filed: Jun. 22, 2012

(65) Prior Publication Data

US 2013/0347074 A1 Dec. 26, 2013

(51) Int. Cl.
*G06F 15/16* (2006.01)
*G06F 21/60* (2013.01)

(52) U.S. Cl.
CPC ................................... *G06F 21/606* (2013.01)
USPC .............. 726/4; 726/1; 726/2; 726/3; 726/17; 726/21; 235/381; 235/382; 235/454; 235/462.01; 235/462.07

(58) Field of Classification Search
CPC ......... G06F 21/30; G06F 21/31; G06F 21/44; G06F 21/445; G06F 21/45; H04L 9/00; H04L 9/0813; H04L 9/0844; H04L 9/32; H04L 9/3213; H04L 9/3226; H04L 9/3228; H04L 9/3231; H04L 9/3234; H04L 9/3242; H04L 61/203; H04L 61/2571; H04L 63/08; H04L 63/0807; H04L 63/083; H04L 63/0853; H04L 67/146

USPC .............. 726/1–4, 17, 21; 235/381, 382, 454, 235/462.01, 462.07
See application file for complete search history.

(56) References Cited

U.S. PATENT DOCUMENTS

| | | | |
|---|---|---|---|
| 5,317,135 A | 5/1994 | Finocchio | |
| 6,993,507 B2 | 1/2006 | Meyer et al. | |
| 7,207,481 B2 * | 4/2007 | Barenburg et al. | ........... 235/381 |
| 7,427,017 B2 | 9/2008 | Morrison et al. | |
| 7,909,243 B2 | 3/2011 | Merkow et al. | |
| 8,002,175 B2 | 8/2011 | Kuriyama et al. | |
| 2002/0010800 A1 | 1/2002 | Riley et al. | |
| 2002/0111884 A1 | 8/2002 | Groat et al. | |
| 2003/0134648 A1 | 7/2003 | Reed et al. | |
| 2004/0039937 A1 | 2/2004 | Aissi et al. | |
| 2008/0313081 A1 | 12/2008 | Wee | |
| 2010/0017860 A1 | 1/2010 | Ishida | |
| 2010/0138344 A1 | 6/2010 | Wong et al. | |
| 2011/0029769 A1 | 2/2011 | Aissi et al. | |
| 2011/0246291 A1 | 10/2011 | Paul | |
| 2011/0251892 A1 | 10/2011 | Laracey | |
| 2011/0264586 A1 | 10/2011 | Boone et al. | |
| 2011/0270751 A1 | 11/2011 | Csinger et al. | |
| 2011/0282965 A1 | 11/2011 | Dodson | |

(Continued)

*Primary Examiner* — Thanhnga B Truong
(74) *Attorney, Agent, or Firm* — Pepper Hamilton LLP (57) ABSTRACT

Systems and methods for presenting a request are disclosed. The systems and methods may include one or more steps, such as receiving, by an electronic device, request information from an entity. The request information may include a request for approval by a user. The steps may further include transmitting, by the electronic device, data containing the request information to a computing device, receiving, by the electronic device, a symbology corresponding to the request information from the computing device and presenting, by the electronic device, the symbology to the user.

12 Claims, 9 Drawing Sheets

(56) References Cited

U.S. PATENT DOCUMENTS

| | | |
|---|---|---|
| 2011/0283196 A1 | 11/2011 | Berger et al. |
| 2012/0203696 A1 | 8/2012 | Morgan et al. |
| 2012/0203701 A1 | 8/2012 | Ayuso De Paul |
| 2013/0061337 A1 | 3/2013 | Zimberoff et al. |
| 2013/0069794 A1* | 3/2013 | Terwilliger et al. ...... 340/815.45 |
| 2013/0124412 A1 | 5/2013 | Itwaru |
| 2013/0167213 A1 | 6/2013 | Sandhu et al. |
| 2014/0090035 A1 | 3/2014 | Kodama |

\* cited by examiner

SYSTEMS AND METHODS FOR PROVIDING A ONE-TIME AUTHORIZATION

BACKGROUND

Recently, the use of mobile devices, such as smartphones and the like, has rapidly increased. This increase has resulted in part from the porting of technologies to mobile electronic devices that were once limited to non-mobile applications. Mobile technologies provide the promise of a more efficient use of time by allowing interactions with other people and entities at any time and place.

One way in which individuals interact with others is by providing requests for approval. For example, an individual could be requested to approve the details of a transaction, approve an agreement, approve an enrollment and/or the like. In current systems, approval requires a manual signature, entering information on a form, inputting a passcode in an electronic form and the like. In these systems, the approval process is slow and cumbersome.

SUMMARY

In an embodiment, a method of presenting a request may include receiving, by an electronic device, request information from an entity. The request information may include a request for approval by a user. The method may further include transmitting, by the electronic device, data containing the request information to a computing device, receiving, by the electronic device, a symbology corresponding to the request information from the computing device and presenting, by the electronic device, the symbology to the user.

In an embodiment, a method of handling a request from an entity may include receiving, by a computing device, data corresponding to the request from the entity, generating, by the computing device, a symbology corresponding to the data, providing, by the computing device, the symbology to a user and receiving, by the computing device, the symbology from the user. The receiving may indicate a confirmation of the request by the user.

In an embodiment, a system for handling a request from an entity may include a processing device and a non-transitory, processor-readable storage medium in communication with the processing device. The non-transitory, processor-readable storage medium may contain one or more programming instructions that, when executed, cause the processing device to receive data corresponding to the request from the entity, generate a symbology corresponding to the data, provide the symbology to a user and receive the symbology from the user. The receiving may indicate a confirmation of the request by the user.

In an embodiment, a system of presenting a request may include a processing device and a non-transitory, processor-readable storage medium in communication with the processing device. The non-transitory, processor-readable storage medium may contain one or more programming instructions that, when executed, cause the processing device to receive request information from an entity. The request information may include a request for approval by a user. The non-transitory, processor-readable storage medium may further contain one or more programming instructions that, when executed, cause the processing device to transmit data comprising the request information to a computing device, receive a symbology corresponding to the request information from the computing device and present the symbology to the user.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An "electronic device" refers to a device that includes a processing device and tangible, computer-readable memory. The memory may contain programming instructions that, when executed by the processing device, cause the device to perform one or more operations according to the programming instructions. Examples of electronic devices include personal computers, gaming systems, televisions and mobile devices.

A "mobile device" refers to an electronic device that is generally portable in size and nature. Accordingly, a user may transport a mobile device with relative ease. Examples of mobile devices include pagers, cellular phones, feature phones, smartphones, personal digital assistants (PDAs), cameras, tablet computers, phone-tablet hybrid devices, laptop computers, netbooks, ultrabooks, global positioning satellite (GPS) navigation devices, in-dash automotive components, media players, watches and the like.

A "computing device" is an electronic device, such as, for example, a computer, a server or components thereof. The computing device can be maintained by entities such as financial institutions, corporations, governments, and/or the like. The computing device may generally contain a memory or other storage device for housing programming instructions, data or information regarding a plurality of users, such as, for example, contact information, personal information, account information, account balances, account numbers and service login information. The computing device may also have data regarding product inventories, billing information, purchase order information, contracts, bills of sale, and/or the like. The data may optionally be contained on a database, which is stored in the memory or other storage device. The data may optionally be secured by any method now known or later developed for securing data. The computing device may further be in operable communication with one or more electronic devices, such as, for example, the mobile devices described herein. The communication between the computing device and each of the mobile devices may further be secured by any method now known or later developed for securing transmissions or other forms of communication. The computing device may further contain a registry of "authorized users" wherein the authorized users are users that have registered to use the systems and methods described herein. Users may obtain "authorized user" status by, for example, providing contact information, account information, and/or the like.

Figure 1:
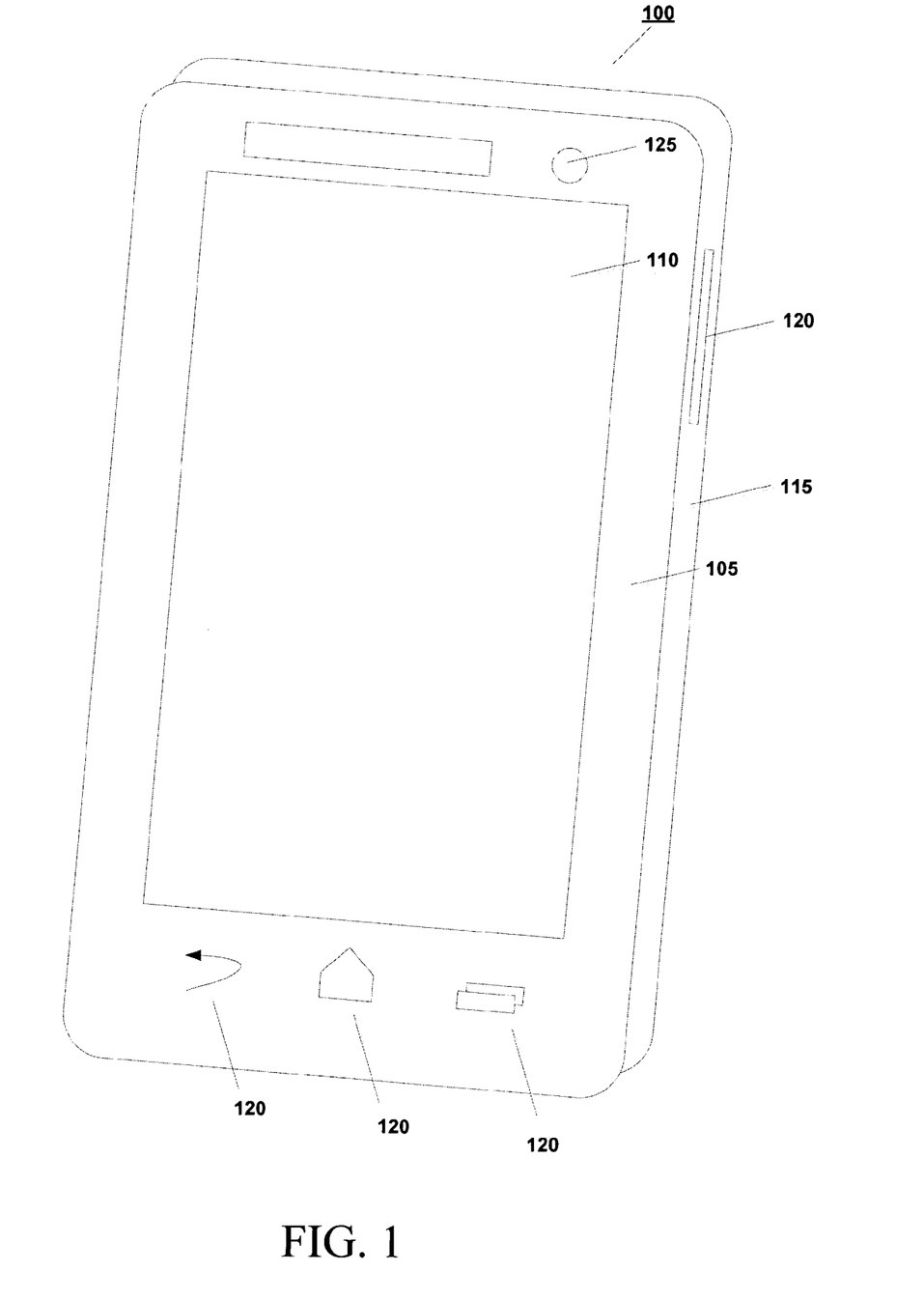
FIG. 1 depicts a perspective view of a first and second face of a mobile device according to an embodiment.

A "symbology" is a pattern, a symbol, an image or the like, as well as portions and combinations thereof, that is displayed on a substrate, such as, for example, the display depicted in FIG. 1. The symbology provides an optical, electronically-readable encoded representation of data. Symbologies can include, without limitation, one-dimensional barcodes, two-dimensional (2D) barcodes or three-dimensional barcodes. Examples of two-dimensional barcodes include data matrix codes, quick response codes, Aztec codes, Maxi codes and the like. Symbologies can also include letters, numbers, punctuation and other symbols. The symbology may be displayed on a display and may be of any geometric shape or size. In this document, the terms "barcode" or "matrix code" may be used in the examples, but the term is intended to include any type of symbology.

Figure 6:
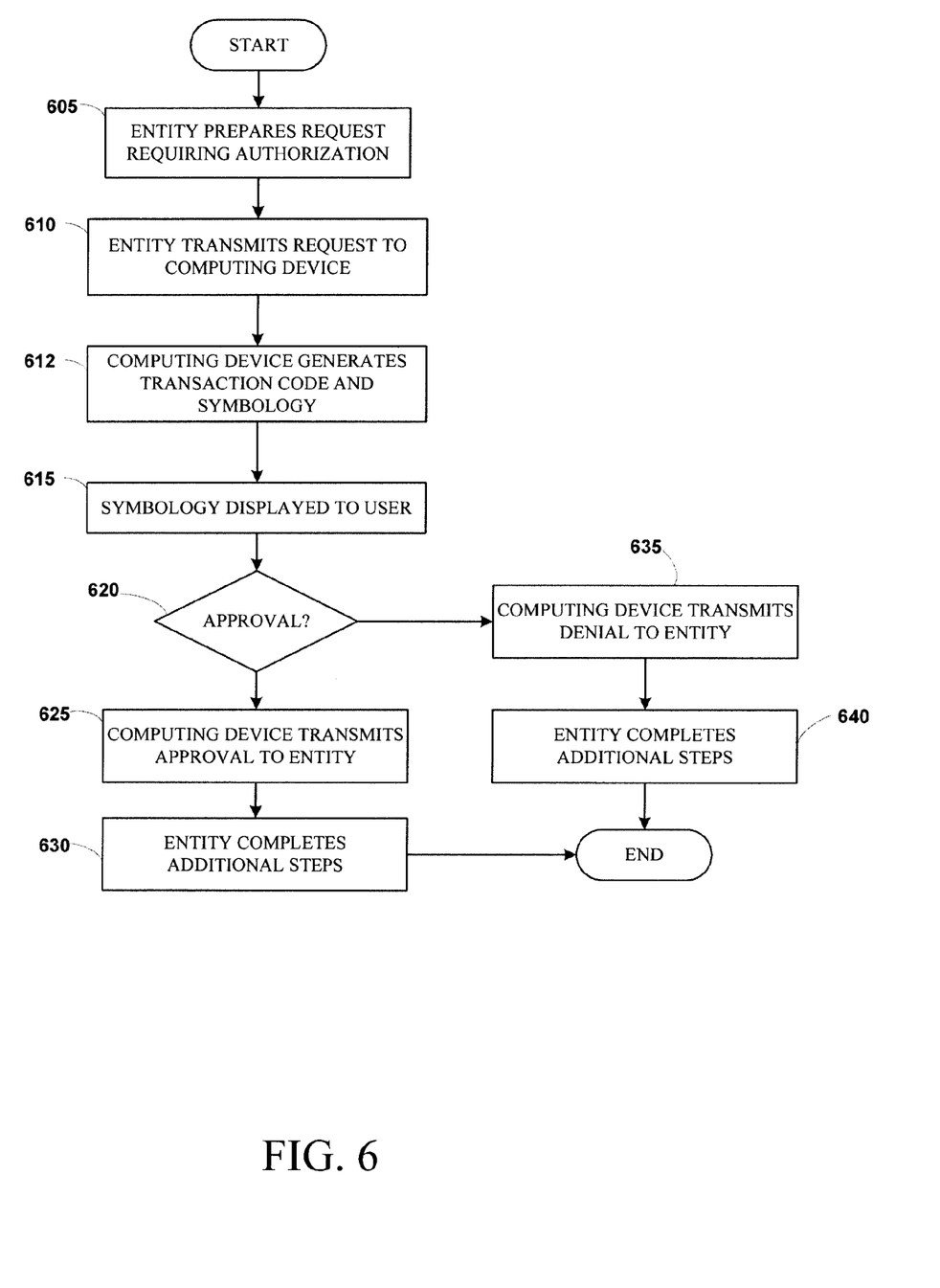
FIG. 6 depicts a flow diagram of an illustrative process for sending an authorization request according to an embodiment.
Figure 7:
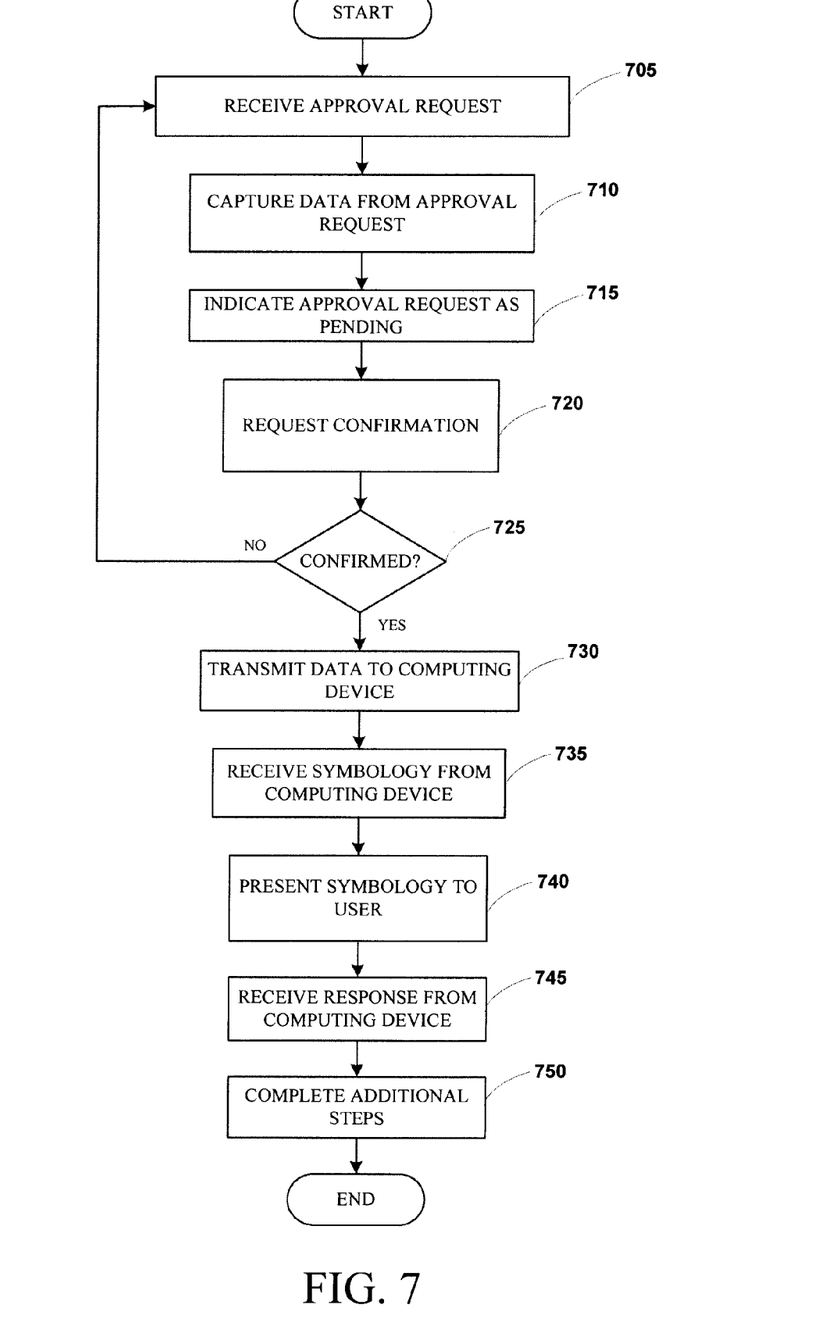
FIG. 7 depicts a flow diagram of an illustrative process that may be carried out by an entity's electronic device according to an embodiment.
Figure 8:
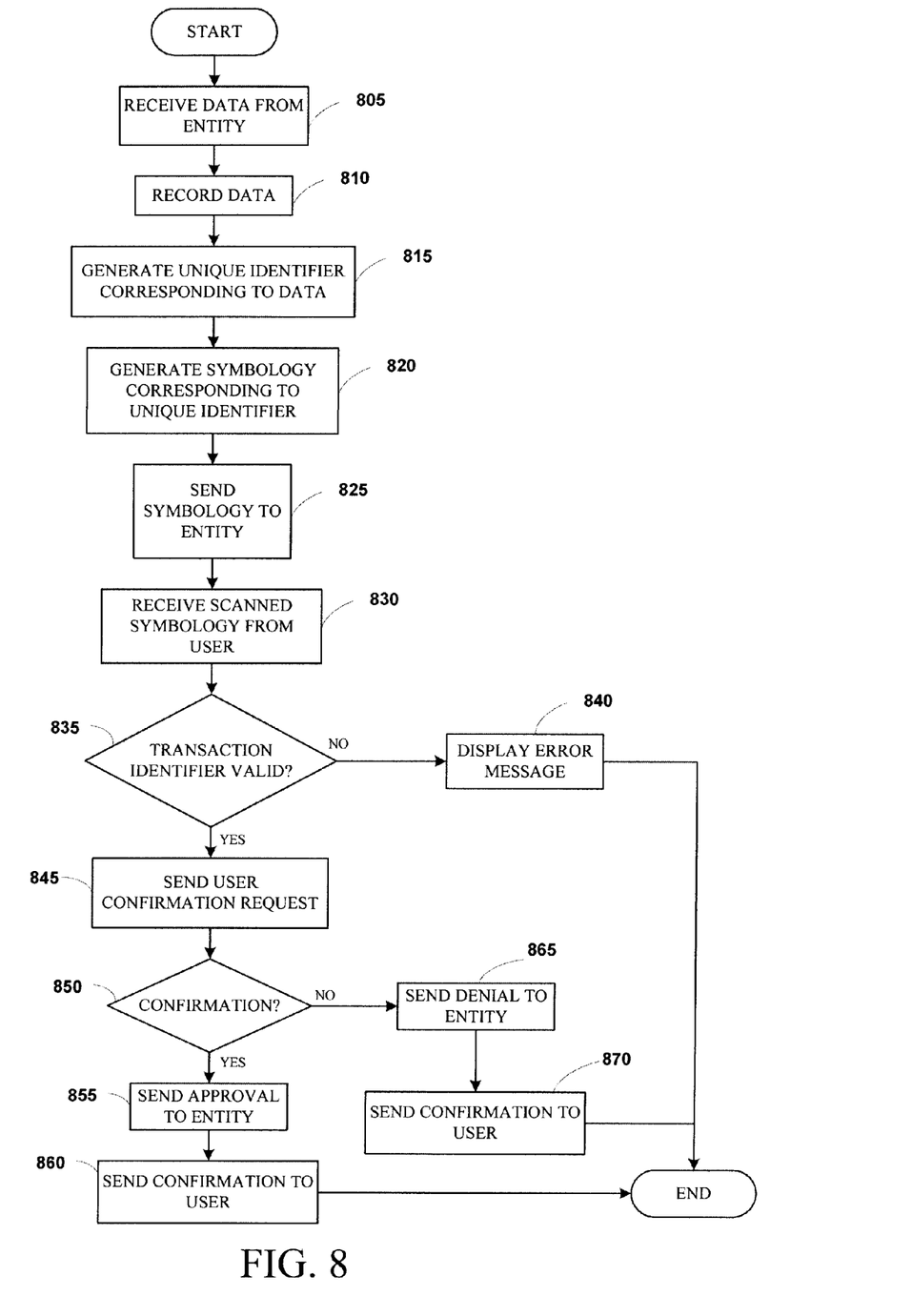
FIG. 8 depicts a flow diagram of an illustrative process that may be carried out by a computing device according to an embodiment.

An "application environment" is an embodiment of programming instructions that direct the various components of each electronic device to execute a plurality of steps, such as those described in more detail in reference to FIGS. 6, 7 and 8. The application environment, when contained in a mobile device, may be referred to as a "mobile application environment." Similarly, the application environment, when contained in a computing device, may be referred to as a "computing application environment." The mobile application environment may be a software application or the like, such as a smartphone "app." The mobile application environment may generally provide a means for reading, decoding, encoding and communicating the data encoded by a symbology. The computing application environment may generally provide a means for communicating with each mobile device, a means for reading, translating and transmitting data, and a means for completing other tasks, as described in greater detail herein.

An "entity" is an individual, a corporation, a financial services provider, a government and/or the like that prepares a request requiring authorization from a user. In addition, a "user" is an individual, a corporation, a financial services provider, a government and/or the like that receives the request requiring authorization in the form of a symbology, and either approves or rejects the authorization. While this disclosure relates generally to a single entity and a single user, those skilled in the art will recognize that multiple entities and multiple users may be involved in a transaction without departing from the scope of this disclosure. Both the entity and the user may be authorized users of the application environment. In some embodiments, the user may hold an account with the entity. Examples of accounts are not limited by this disclosure and may include, for example, savings accounts, checking accounts, money market accounts, brokerage accounts, credit accounts, certificates of deposit, electronic wallet accounts, pooled accounts or the like. Funding for a pooled account may be obtained from a combination of one or more of the accounts described herein. In other embodiments, the accounts may be held with, for example, financial institutions, banks, credit bureaus, building societies, credit unions, trust companies, mortgage loan companies, insurance companies, pension funds, brokers, underwriters, investment funds or the like. The accounts may further contain some form of identifier, such as, for example, an American Bankers Association (ABA) routing transit number (RTN), account numbers, or any other identifier that may be used for identifying an user and/or a user's account.

FIG. 1 depicts a perspective view of a mobile device, generally designated 100, according to an embodiment. The mobile device may have a first face 105 and a second face 115. The first face 105 may have a display 110. The display 110 may generally be a component for displaying images, text, video and the like. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The mobile device 100 may be configured to generate a symbology and/or display the generated symbology on the display 110, as described in more detail herein. The mobile device 100 may generate the symbology by using any methods now known or later developed for creating and encoding symbologies. Alternatively, the mobile device 100 may receive the symbology from another mobile device and/or a computing device.

The mobile device 100 may further have one or more user interface components 120, which may be positioned on any face of the device, including, but not limited to, the first face 105 and the second face 115. The one or more user interface components 120 may generally be configured to elicit one or more commands to the mobile device 100 when actuated. Examples of user interface components 120 may include keypads, switches, buttons and/or the like.

As an alternative to, or in conjunction with the one or more user interface components 120, the display 110 may further include a touch sensitive screen, wherein the touch sensitive screen may act as a user interface component. The touch sensitive screen may receive contact based inputs from a user, such as from a user's fingers. The touch sensitive screen may be adapted for gesture control, thus allowing for a user to tap, pinch, swipe or provide other similar gestures to elicit commands to the mobile device 100. The touch sensitive screen may further be capable of sending touch commands to the processing device. Examples of touch sensitive screens may include, but are not limited to, resistive touchscreens, capacitive touchscreens, infrared touchscreens and/or other technologies now known or later developed. The mobile device 100 may also be adapted to receive commands via body gestures, voice, audio signals, device movement and/or the like.

Figure 2:
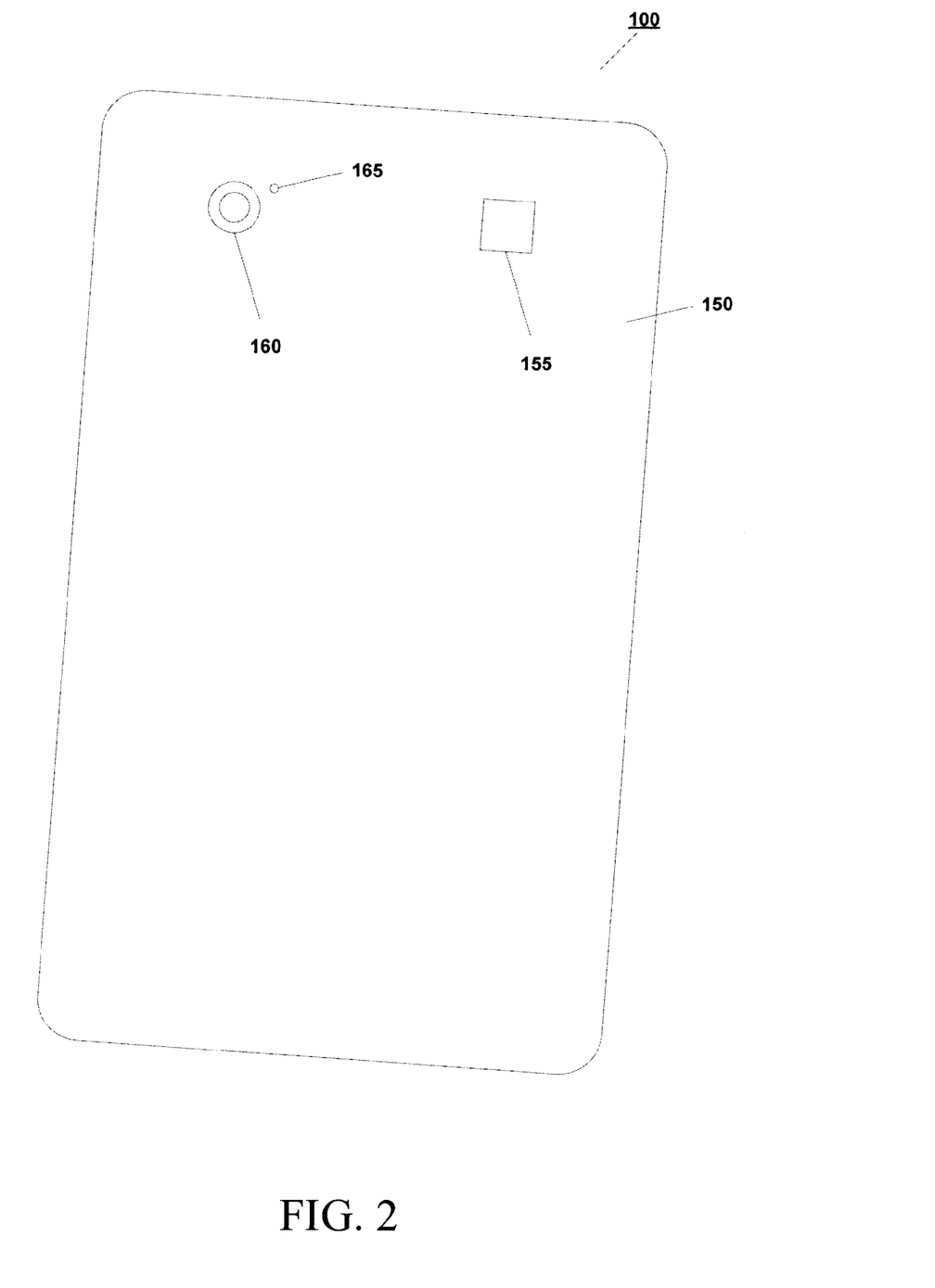
FIG. 2 depicts a perspective view of a third face of the mobile device in FIG. 1 according to an embodiment.

FIG. 2 depicts a perspective view of a third face 150 of the mobile device 100, according to an embodiment. The third face 150 may generally have an optical component 160. The third face 150 may also optionally have an audio component 155 and/or an illumination component 165.

The optical component 160 may be any suitable component capable of receiving an optical image and transmitting image information to other components of the mobile device 100 for processing, such as, for example, a camera. The optical component 160 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the mobile device 100 may be properly positioned from the intended object to be imaged to achieve a clear image.

While the optical component 160 is depicted on the rear face of the present example, persons skilled in the art will appreciate that the optical component 160 may be positioned at any location on or in any face of the mobile device 100, or may even be external to the mobile device 100 and connected by any means of communication, including, but not limited to, physical cable communication such as universal serial bus (USB), wireless radio communication, wireless light communication, or near field communication technology.

The optical component 160 may further be configured to receive an optical image on the display of another mobile device, such as, for example, a symbology displayed on the display of the other mobile device, as described in greater detail herein.

The optional illumination component 165 may be utilized in any light conditions to assist the optical component 160 in completing any of the tasks described herein. Additionally, the illumination component 165 may be independently activated to turn on or off at specific points in time, such as when additional lighting is necessary to capture an ideal image. Other features of the illumination component 165 may include dimming, strobe, constant on and/or the like.

The illumination component 165 may contain any suitable light source capable of providing illumination, including, but not limited to, magnesium-based flashes, xenon-based flashes, fulminate-containing flashes, light-emitting diode (LED) flashes and the like. While the present figure depicts the illumination component 165 as being integrated with the mobile device 100, it may be appreciated that the illumination component 165 may be a separate component in communication with the mobile device 100, such as USB based flashes, hot shoe based flashes, remote slave flash units, or other similar devices.

The optional audio component 155 may be adapted to emit audio tones and signals. Such audio tones and signals may be used to instruct the user to complete various steps as described herein, and may further indicate to the user that an image has been received by the optical component 160 by emitting a beep, click or other audio signal. Additionally, the audio component 155 may be adapted to receive audio signals. Such audio signals may include, for example, voice commands from a user.

Figure 4:
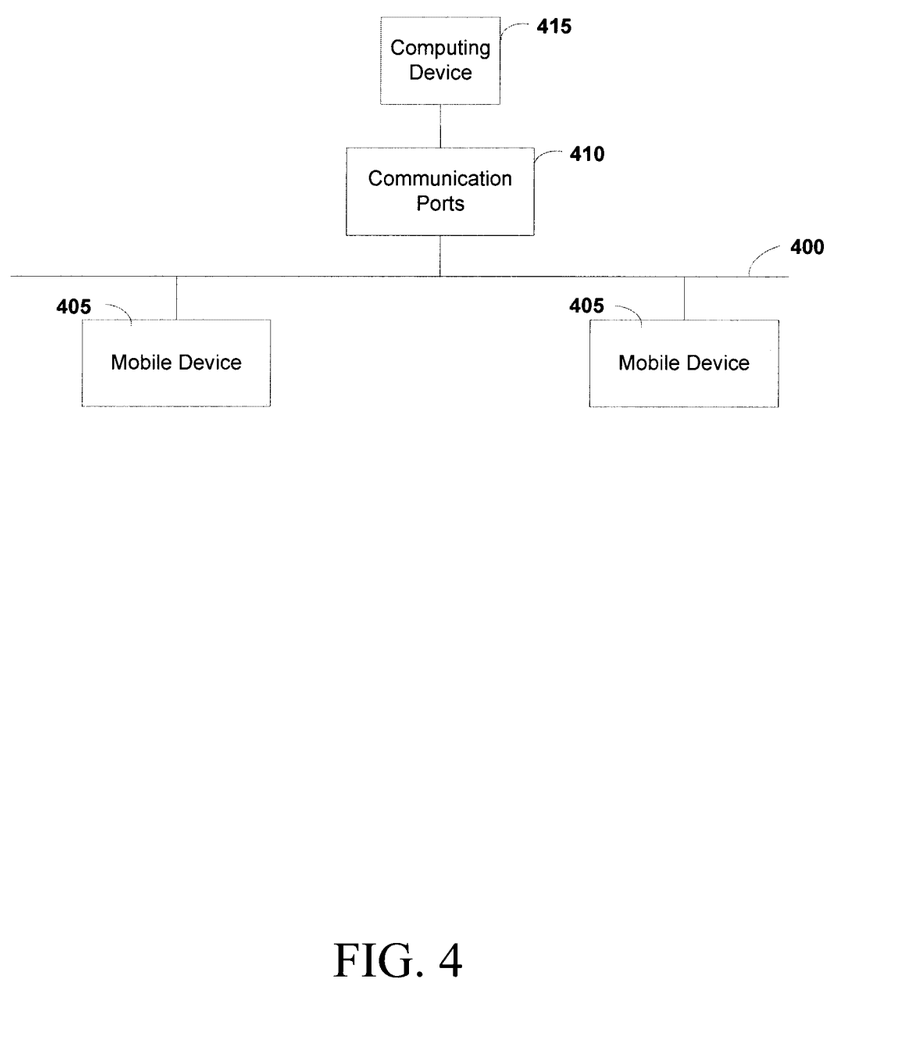
FIG. 4 depicts a block diagram of an illustrative communications system between mobile devices and a computing device according to an embodiment.

The mobile device 100 may further have an ability to connect to a communications network, as described in FIG. 4 herein. The types of communications networks that may be used in accordance with this disclosure are not limited in any manner, and may include any communications network now known or later developed. For example a communications networks may include, but is not limited to, the Internet, an intranet, a wide area network (WAN), a local area networks (LAN), a wireless local area networks (WLAN), a storage area networks (SAN) and/or the like.

The configuration of the mobile device 100 as shown in FIGS. 1 and 2 is merely an example of a mobile device, and persons skilled in the art will appreciate that other configurations and embodiments will be possible without departing from the scope of this disclosure.

Figure 3:
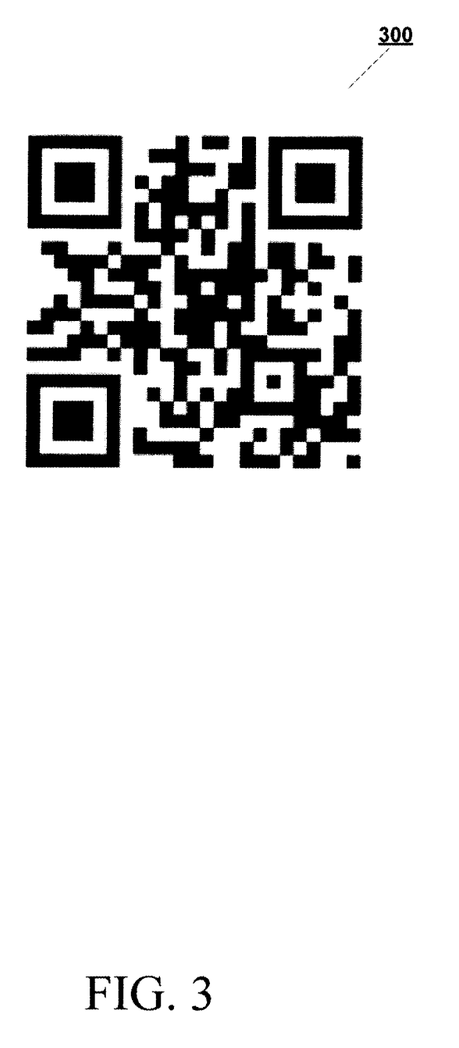
FIG. 3 depicts a symbology according to an embodiment.

FIG. 3 depicts an example of a symbology, generally designated 300, that may be used in accordance with an embodiment. The symbology 300 may be displayed, for example, on the display 110 of the mobile device 100 (FIG. 1), displayed on a display of an electronic device or affixed to a substrate.

The symbology 300 may be generated by a mobile device 100, or may be generated by any other electronic device, such as for example, a computing device. In instances where the symbology 300 is generated by anything other than the mobile device 100, it may be transmitted to the mobile device 100 for further use, such as for display upon the display 110 (FIG. 1), addition to other documents and/or elements, or for scanning, reading or decoding.

The symbology 300 may be encoded with data, such as data having a unique identifier that may generally be used by a computing device to gain access to secured information and unsecured information. Examples of secured information may include, but are not limited to, information regarding a user's banking account, an amount of money to be sent and/or received, a date and time of transmission of money for future payments, and/or the like. Examples of unsecured information may include, for example, information regarding a product or a service, information regarding a merchant, purchase payment information, information about a bill and purchase order information.

The information encoded in the symbology 300 may further be encrypted. In instances where the information encoded in the symbology 300 is encrypted, the symbology 300 may only be read by certain symbology reading devices and/or applications, such as those that contain or maintain access to an encryption key or another similar means for decrypting the information encoded in the symbology 300. Encryption may be completed by any encryption method now known or later developed. Examples of encryption may include, but are not limited to, manual encryption, transparent encryption, symmetric encryption, asymmetric encryption and the like.

As an alternative to being encrypted, the symbology 300 may be readable by any symbology reading device and/or application. However, the information encoded within the symbology 300 may appear to a user of the symbology reading device and/or application as a random placement of characters, numbers, symbols and the like. However, if the symbology 300 is read using the application environment, the application environment may recognize the characters, numbers, symbols and the like and may perform or complete tasks accordingly, as described in more detail herein.

The symbology 300 may be a standalone image, or may be incorporated within another object, such as, for example, an additional image, text, icons and/or the like. In instances where the symbology 300 is incorporated within another object, the other object may provide at least a portion of the information encoded by the symbology 300.

FIG. 4 depicts a block diagram of communications between one or more electronic devices and one or more computing devices. A communications network 400 may serve as an information highway interconnecting the other illustrated components. The communications network is not limited by this disclosure, and may include any communications network now known or later developed. Examples of communications networks may include, but are not limited to, the Internet, intranets, wired networks and wireless networks. One or more electronic devices 405, such as mobile devices, computing devices and the like may connect to the communications network 400. In embodiments where a plurality of electronic devices 405 are connected to the communications network 400, each electronic device 405 may be configured to communicate with other electronic devices via the communications network 400. A computing device 415 may also be connected to the communications network 400, and may optionally connect through the use of one or more communications ports 410.

Figure 5:
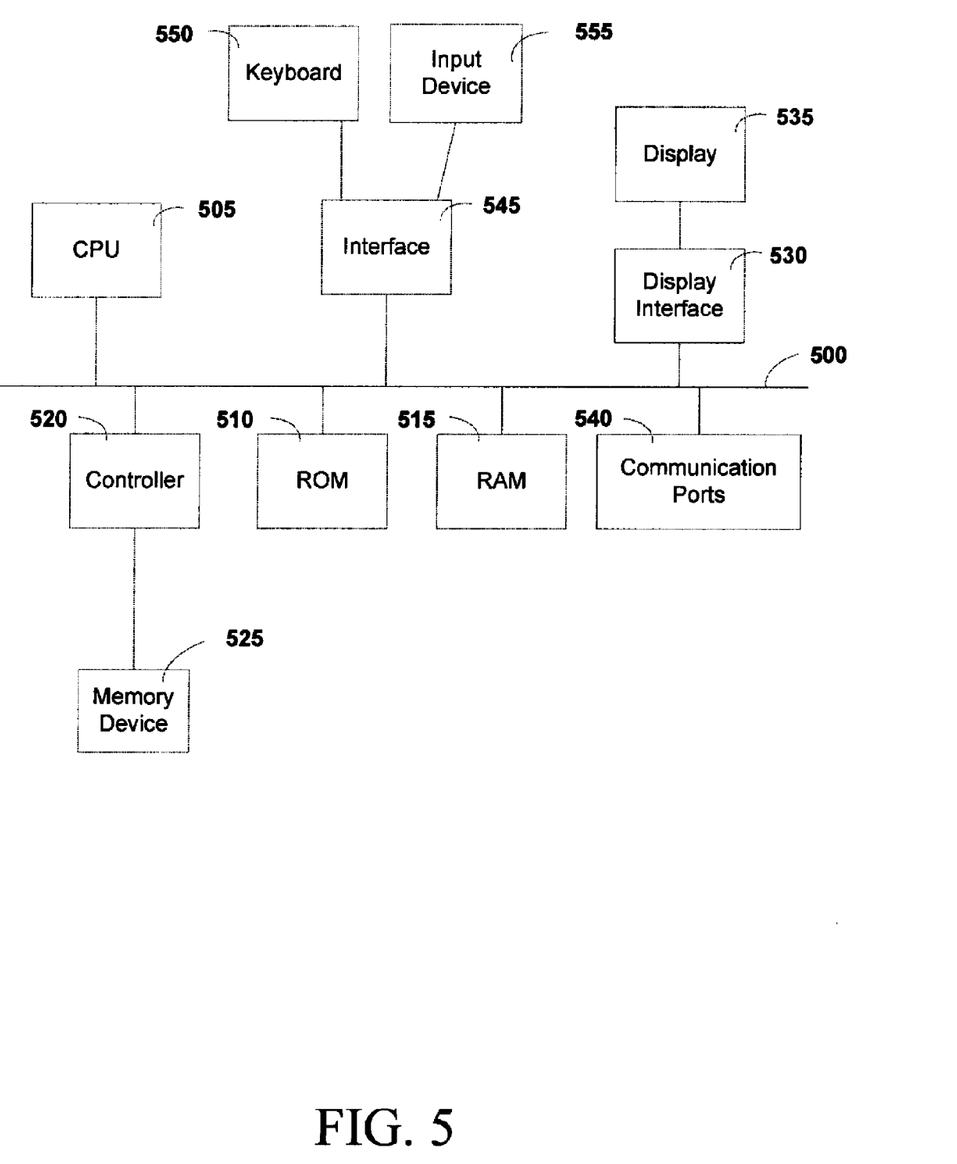
FIG. 5 depicts a block diagram of illustrative internal hardware that may be used to contain or implement program instructions according to an embodiment.

FIG. 5 depicts a block diagram of illustrative internal hardware that may be used to contain or implement program instructions, such as the process steps discussed herein in reference to FIGS. 6-8, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an illustrative processing device, computing device or processor as such terms are used within this disclosure. Read only memory (ROM) 510 and random access memory (RAM) 515 constitute illustrative memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An illustrative communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

FIG. 6 depicts a general authorization process according to an embodiment. The process may involve a plurality of users, such as, for example, an entity and a user. Each user may have an electronic device and may conduct one or more steps provided herein on the electronic device, as described herein. Each electronic device may have a processor and a memory containing programming instructions, such as programming instructions in the form of the application environment.

The entity may prepare 605 a request requiring authorization. The request requiring authorization may generally be any request that requires an authorization and/or an approval from the user. Moreover, the request is not limited by this disclosure and may include, for example, payment requests, transaction requests, requests for approval of an agreement, enrollment requests and/or the like. The request may be completed by the entity using any method of submitting a request to the respective electronic device and is not limited by this disclosure. Examples of methods that the entity may use include email submissions, paper form submissions, electronic form submissions and/or the like. The request may be submitted in the application environment on the entity's electronic device. At the time the request is made, additional information about the request may also be recorded. Examples of such additional information may include, but are not limited to, positional coordinates (e.g., GPS coordinates), a date and/or a time that the information was entered, the type of electronic device used, user name and password information used to access the application environment, and/or the like.

The entity's electronic device may transmit 610 the request received from the entity to the computing device. The entity's electronic device may also submit the additional information collected at the time of submission. In return, the computing device may generate 612 a unique transaction code and a symbology and may transmit the transaction code and/or the symbology to the entity's electronic device. The entity's electronic device may present 615 the symbology to the user, such as by displaying on a display. Alternatively, the symbology may be presented 615 to the user directly from the computing device. The user may scan the symbology using the application environment and may be presented with an option to approve and/or verify 620 the authorization. In an embodiment, approval may be completed by the user by affirmatively selecting an approval option in the transaction environment. In an alternate embodiment, approval may be completed by scanning the symbology. If the user approves the request, the computing device may transmit 625 a notice of approval to the entity, allowing the entity to complete 630 additional steps, such as, for example, proceeding with a transaction, completing an agreement, transferring funds, completing an enrollment and/or the like. If the user does not approve the request, the computing device may transmit 635 a notice of denial to the entity, allowing the entity to complete 640 additional steps, such as, for example, cancelling a transaction, cancelling an agreement, cancelling an enrollment and/or the like. The entity may also amend the request and restart the process with the amended request.

FIG. 7 depicts a process that may be carried out by the entity's electronic device in response to the entity's request according to an embodiment. The process depicted herein may generally be completed within the application environment, as previously described herein.

The entity's electronic device may receive 705 a submission from the entity. The submission may be embodied within an electronic form, a paper form, a vocal command, an email request and/or the like. The submission may generally contain information regarding the details of the request, such as, for example, a deadline by which the request must be approved or denied, an identification of the user, payment amounts, agreement details, expiration dates, validity dates and/or the like. Other details may include the user's name, the user's address, the user's phone number, the user's email address, the user's account number, authorized persons allowed to respond on behalf of the user, an amount to be transferred, a personal note to the user, the entity's name, the entity's address, the entity's phone number, the entity's email address, the entity's account number, authorized persons allowed to act on behalf of the entity, a name and address of a financial institution in which the entity holds an account, identification numbers for the entity's financial institution (i.e., routing numbers) and/or the like. In some embodiments, the request may be in the form of a payment request, which may further specify additional parameters, such as, for example, a time the funds should be sent, limit options, expiration dates, and/or the like. The request may also contain other information not entered by the entity, but recorded at the time the request was made, such as, for example, positional coordinates (e.g., GPS coordinates), a date and/or a time that the information was entered, the type of electronic device used, user name and password information used to access the application environment, and/or the like.

The request may be inputted, for example, by means of a physical interaction with the entity's electronic device containing the application environment. Examples of physical interaction may include, for example, touching any number of user interface components, a touch screen and/or the like, as described herein. Alternatively or additionally, the inputs may be in the form of audio commands, gestures, physical movement of the electronic device and/or the like. In some embodiments, the payment specified may be any type of funds, financial instruments or currency. Examples of financial instruments may include, but are not limited to, securities, stocks, bonds, mutual funds, derivative contracts, commodities, and any other fungible, tradable asset.

The information from the request and the other information may be captured 710 as data by the entity's electronic device. The entity may indicate 715 the request as "pending," thereby identifying the request as one that has been initiated, but has not been approved in accordance with an embodiment. The electronic device may optionally request 720 that the entity confirm the entered request corresponds to the captured data. The request may be a confirmation displayed after the submission is inputted by the entity into a web-based form, a telephone call to confirm the submission, an email to confirm the submission, a text message to confirm the submission and/or the like. The electronic device may determine 725 whether approval is received, and if approval is not received, the electronic device may require the entity to resubmit 705 information, thereby restarting the process. Alternatively, the process may end if approval is not received. If the electronic device does receive confirmation from the entity, the electronic device may transmit 730 the data to a computing device. Transmission of the data may be completed by using, for example, a secure means of communication, as described in greater detail herein.

Once a symbology has been generated, the entity's electronic device may receive 735 the symbology from the computing device. Reception may be via a secure means of communication, as described in greater detail herein. Alternatively, the entity's electronic device may receive a unique identifier from the computing device and may generate the symbology in lieu of receiving 735 the symbology from the computing device. The symbology may then be presented to the user 740 for use in completing the transaction, as described in FIG. 8.

FIG. 8 depicts a process that may be carried out by a computing application environment on an electronic device, such as, for example, a computing device according to an embodiment. The computing device may receive 805 data from the entity. The data may include information regarding the request, as well as other information, as previously described herein. The computing device may record 810 the data, such as in a memory, a database and/or the like, as described herein.

The computing device may generate 815 a unique identifier that corresponds to the data. The unique identifier may generally be a unique code that allows the computing device to identify the data. The unique identifier may only be recognizable to the computing device, and may not be recognizable to other electronic devices, users and the like. Once the unique identifier has been generated, the computing device may encode 820 the unique identifier within a symbology and transmit 825 the symbology to the entity and/or the user. Alternatively, the unique identifier may be sent to the entity, whereby the entity encodes the transaction identifier into the symbology, as previously described herein.

The computing device may receive 830 the symbology and/or the unique identifier encoded therein from the user, which may generally occur when the user scans the symbology using the application environment on a mobile device to confirm the request. In addition, the computing device may also receive other optional information along with the symbology and/or the unique identifier. The other optional information may include, for example, a message from the user, positional coordinates (e.g., GPS coordinates), a date and/or a time that the symbology was scanned, the type of electronic device used, user name and password information used to access the application environment, and/or the like.

Once received, the computing device may determine 835 whether the unique identifier encoded by the symbology is still valid. Validity of the unique identifier may be determined by verifying that it has not expired, has not been previously used, has not been revoked and/or the like. If the unique identifier is not valid, the computing device may display 840 an error message to the user. The error message may be, for example, a message displayed on the user's electronic device, an audio alert, a video alert, a haptic feedback alert, an email, a text message, a phone call and/or the like.

If the transaction identifier is determined to be valid, the computing device may optionally send 845 a confirmation request to the user to confirm the terms of the funds transfer. The confirmation request may be sent, for example, by email, by text message, by telephone call, by a message displayed on the user's electronic device and/or the like. The computing device may then determine 850 whether the user confirms that the confirmation request is correct. Confirmation may generally be in the form of a response from the user, such as, for example, responding to an email, text message or telephone call, clicking a link on a website, clicking a button in the mobile application environment and/or the like. A period of time may elapse before a confirmation is deemed to have not been received. The period of time is not limited by this disclosure, and can be any period of time that may be set by, for example, the entity, the user or the application environment. In an embodiment, the period of time may be in a range of about 1 minute to about 365 days. The confirmation may further be deemed to not have been received if the user replies to the confirmation request in the negative, i.e., by notifying the computing device that the terms of the funds transfer are not correct. If a confirmation is not received, the computing device may send 865 a denial message to the entity. The denial may be, for example, any type of notification that the request was not approved. Additionally, the computing device may send 870 a denial confirmation to the user, thereby ending the process.

If the computing device receives confirmation from the user, the computing device may transmit 855 an approval notice to the entity. The approval notice is not limited by this disclosure, and may be a message, a notification, a transmission and/or the like. The approval notice may further be a simple "APPROVED" statement, may identify the request, may identify the entity and/or the user, may provide additional information regarding the request, and/or the like. The approval notice may be provided via any method, such as, for example, an email, a text message, a telephone call, a postal mailing, a facsimile transmission, a text notification on an electronic device, a video notification on an electronic device, an audio notification on an electronic device, a haptic notification on an electronic device and/or the like. In some embodiments where the approval notice is for a funds transfer, the types of funds transfers that may be used are not limited by this disclosure and may include any type of funds transfer now known or later developed. Examples of funds transfers may include, for example, electronic funds transfers (EFT), automatic clearinghouse (ACH) transfers, electronic benefit transfers (EBT), wire transfers, delivery of a check, delivery of cash, transfer between electronic wallet accounts and/or the like. In addition to the approval notice to the entity, the computing device may also provide 860 a confirmation to the user.

Figure 9:
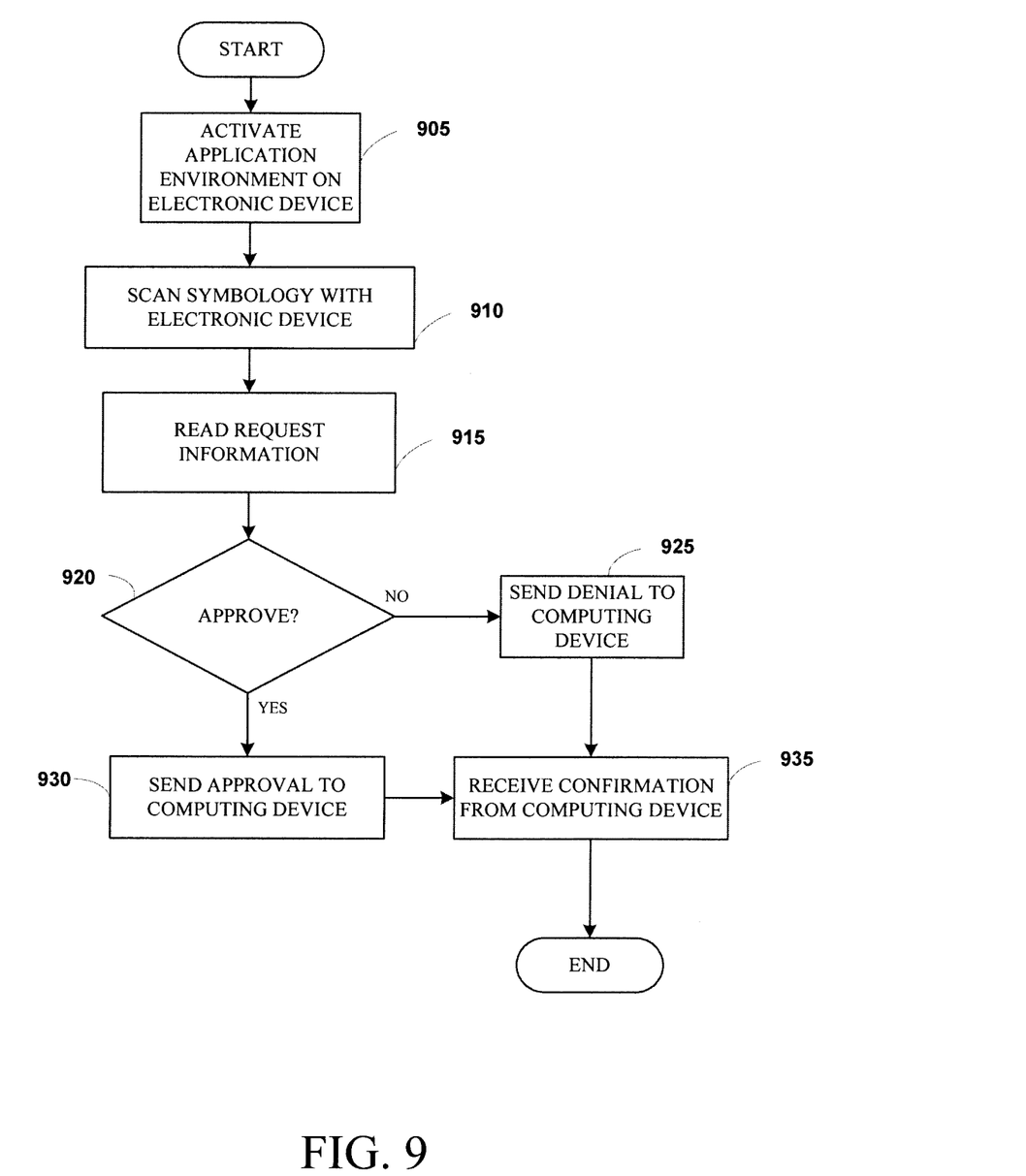
FIG. 9 depicts a flow diagram of an illustrative process that may be carried out by a user according to an embodiment.

FIG. 9 depicts a process that may be completed by the user upon receipt of a symbology corresponding to a request according to an embodiment. The user may activate 905 an application environment on an electronic device and scan 910 the symbology with the electronic device as disclosed in greater detail herein. The electronic device may communicate with a computing device to send the decoded information from the symbology, such as the unique identifier disclosed herein, and may receive information from the computing device. An example of such information may include request information as previously described herein. The user may read 915 the request information and decide 920 whether to approve the request. If the user decides not to approve the request, he/she may direct 925 the electronic device to send a denial notification to the computing device. If the user decides to approve the request, he/she may direct 930 to send an approval notification to the computing device. In certain embodiments, the user may send the denial notification or the approval notification by clicking a button corresponding to the approval/denial in the application environment. In other embodiments, the user may voice an approval or denial. In other embodiments, the user may gesture an approval or denial, such as, for example by providing a hand signal, by shaking his/her head vertically or horizontally and/or the like. Alternatively, the user may not receive details about the request upon scanning the symbology; rather, the mere act of scanning the symbology may deliver an approval command to the electronic device. Upon approval or denial of the request, the user may optionally receive 935 a confirmation of the approval or denial of the request. The confirmation may be a voicemail, email, facsimile transmission, postal mail letter, text message, audio message, video message, text display, and/or the like.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of handling a transaction, the method comprising:
   receiving, by a computing device, data from an entity, wherein the data corresponds to a request from the entity to a user;
   directing, by the computing device, a storage device to record the data;
   generating, by the computing device, a unique identifier that corresponds to the data, wherein the unique identifier is only recognizable to the computing device;
   encoding, by the computing device, a symbology corresponding to the unique identifier;
   providing, by the computing device, the symbology to at least one of the entity and the user; and
   receiving, by the computing device, a confirmation of the request by the user, wherein the confirmation is transmitted by the user upon scanning the symbology.

2. The method of claim 1, wherein the confirmation of the request is an approval confirmation or a denial confirmation.

3. The method of claim 1, further comprising providing, by the computing device, a notice of the confirmation to at least one of the entity and the user.

4. The method of claim 1, further comprising determining, by the computing device, whether the symbology is a valid symbology.

5. The method of claim 1, wherein the symbology comprises one or more of a multi-dimensional bar code and a quick response (QR) code.

6. The method of claim 1, wherein the request comprises at least one of a payment request, a transaction request, an agreement request, and a registration request.

7. A system for handling a transaction, the system comprising:
   a processing device; and
   a non-transitory, processor-readable storage medium in communication with the processing device, wherein the non-transitory, processor-readable storage medium contains one or more programming instructions that, when executed, cause the processing device to:
      receive data from an entity, wherein the data corresponds to a request from the entity to a user;
      direct a storage device to record the data;
      generate a unique identifier that corresponds to the data, wherein the unique identifier is only recognizable to the computing device;
      encode a symbology corresponding to the unique identifier;
      provide the symbology to at least one of the entity and the user; and
      receive a confirmation of the request by the user, wherein the confirmation is transmitted by the user upon scanning the symbology.

8. The system of claim 7, wherein the confirmation of the request is an approval confirmation or a denial confirmation.

9. The system of claim 7, wherein the one or more programming instructions further comprise one or more programming instructions that, when executed, cause the processing device to provide a notice of the confirmation to at least one of the entity and the user.

10. The system of claim 7, wherein the one or more programming instructions further comprise one or more programming instructions that, when executed, cause the processing device to determine whether the symbology is a valid symbology.

11. The system of claim 7, wherein the symbology comprises one or more of a multi-dimensional bar code and a quick response (QR) code.

12. The system of claim 7, wherein the request comprises at least one of a payment request, a transaction request, an agreement request, and a registration request.

* * * * *